(12) United States Patent
Lisiewicz et al.

(10) Patent No.: US 8,561,940 B2
(45) Date of Patent: Oct. 22, 2013

(54) ARRANGEMENT FOR THE SUSPENSION OF A JET ENGINE TO A SUPPORTING STRUCTURE

(75) Inventors: Stephan Lisiewicz, Berlin (DE); Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 184 days.

(21) Appl. No.: 12/964,890

(22) Filed: Dec. 10, 2010

(65) Prior Publication Data

US 2011/0139925 A1 Jun. 16, 2011

(30) Foreign Application Priority Data

Dec. 11, 2009 (DE) .................. 10 2009 054 568

(51) Int. Cl.
*B64D 27/26* (2006.01)

(52) U.S. Cl.
USPC ............................................................ 244/54

(58) Field of Classification Search
USPC ..................... 244/53 R, 54, 55, 56
See application file for complete search history.

(56) References Cited

U.S. PATENT DOCUMENTS

| | | | |
|---|---|---|---|
| 3,020,004 A | | 2/1962 | Blyth et al. |
| 4,603,821 A | * | 8/1986 | White ............................ 244/54 |
| 4,821,980 A | | 4/1989 | Clausen et al. |
| 4,854,525 A | | 8/1989 | Chee |
| 5,443,229 A | * | 8/1995 | O'Brien et al. ................. 244/54 |
| 5,452,575 A | | 9/1995 | Freid |
| 6,131,850 A | | 10/2000 | Hey et al. |
| 2008/0067286 A1 | * | 3/2008 | Cousin et al. .................. 244/54 |
| 2009/0255271 A1 | | 10/2009 | Vauchel et al. |
| 2010/0040466 A1 | | 2/2010 | Vauchel et al. |

FOREIGN PATENT DOCUMENTS

| | | |
|---|---|---|
| CA | 2696802 | 3/2009 |
| CA | 2697380 | 3/2009 |
| EP | 1627812 | 2/2006 |
| GB | 2010969 | 7/1979 |
| WO | 2008043903 | 4/2008 |
| WO | 2009027333 | 3/2009 |
| WO | 2009027336 | 3/2009 |

OTHER PUBLICATIONS

German Search Report dated Apr. 8, 2010 from counterpart patent application.
NASA Design Report CR-180867—Dec. 1987.
European Search Report and Written Opinion dated May 7, 2013 from counterpart application.

* cited by examiner

*Primary Examiner* — Timothy D Collins
*Assistant Examiner* — Brian M O'Hara
(74) *Attorney, Agent, or Firm* — Timothy J. Klima; Shuttleworth & Ingersoll, PLC

(57) ABSTRACT

An arrangement (1) for suspending a jet engine (12) to a supporting structure (5) attached to an aircraft fuselage, includes a suspension beam (6) to which the engine casing (13) is fitted by a forward suspension (7), a rearward suspension (8) and at least one thrust rod (9) arranged at an angle relative to the suspension beam (6). In order to provide an arrangement for the suspension of a jet engine (12) which enables weight to be saved and deformation of the jet engine (12) to be reduced, the rearward suspension (8) and the thrust rod (9) are connected to the engine casing (13) by a lightweight framework (11).

16 Claims, 1 Drawing Sheet

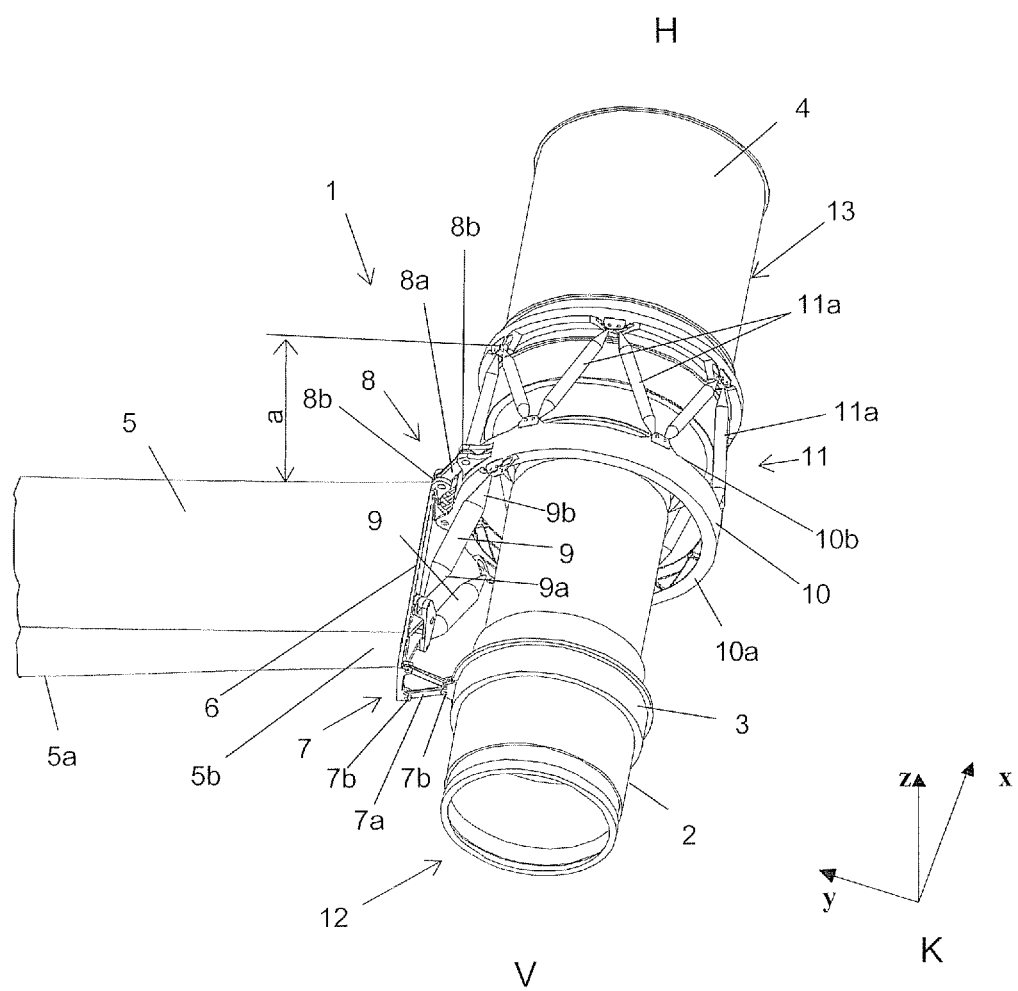

ARRANGEMENT FOR THE SUSPENSION OF A JET ENGINE TO A SUPPORTING STRUCTURE

This application claims priority to German Patent Application DE102009054568.9 filed Dec. 11, 2009, the entirety of which is incorporated by reference herein.

This invention relates to an arrangement for the suspension of a jet engine to a supporting structure.

On fuselage-mounted propfan engines, the propeller plane must be situated sufficiently remote from the fairing (pylon) of the shear-panel carrier to prevent the propeller flow from being affected. Ensuing therefrom is a large overhang moment that is to be dissipated. Such overhang moment leads to a deformation of the jet engine, resulting in a change of the clearance gaps within the jet engine.

The resultant disadvantages are a widely cantilevering suspension beam, an enlarged shear-panel carrier in the pylon and a reinforced casing structure by which the resultant loads are led through the core engine to introduce them into the pylon at a suitable location.

Specification U.S. Pat. No. 4,854,525 discloses a system for mounting a jet engine in which a longitudinally extending beam transfers the forces and moments from the jet engine to a supporting structure by a special connection structure. The supporting structure is attached to the aircraft fuselage. The connection structure includes a rearward and a forward connection on the jet engine and three connections on the supporting structure. Furthermore, a thrust rod transmitting the thrust from the jet engine to the longitudinally extending beam is arranged at an angle relative to the longitudinally extending beam. The longitudinally extending beam, the supporting structure and the engine casing must, however, be designed very massively to be capable of taking up all forces and moments.

NASA Design Report CR-180867, dated December 1987, describes an unducted propfan with the type designation GE36. By use of a forward suspension and two rearward suspensions, the jet engine is here attached to a beam connected to a supporting structure. On this unducted propfan (UDF—unducted fan), the beam is designed very massively, despite the proximity to the shear-panel carrier. The noise requirements on a modern jet engine necessitate that the distance between the propeller plane and the pylon be even more increased, resulting in a larger overhang moment and, consequently, a considerable increase in the size of the beam.

Specification U.S. Pat. No. 4,821,980 describes a beam connecting a jet engine with a supporting structure and transmitting the forces and moments from the jet engine to the supporting structure. The beam is provided with four articulations at its upper side and with further articulations at its bottom side. A D-shaped shell for taking up the jet engine is to be attached to the articulations. Here again, the beam and the supporting structure are of a very massive design.

In a broad aspect, the present invention provides an arrangement for the suspension of a jet engine which enables weight to be saved and deformation of the jet engine to be reduced.

The present invention provides an arrangement for the suspension of a jet engine to a supporting structure attached to an aircraft fuselage, with a suspension beam to which the engine casing is fitted by a forward suspension and which has a rearward suspension and at least one thrust rod arranged at an angle relative to the suspension beam. The rearward suspension and the thrust rod are connected to the engine casing by a lightweight system. The lightweight system can also be of integral design.

The lightweight system is advantageous in that it enables weight to be saved on the supporting structure, the suspension beam and the core engine. This enables a pylon to be designed which is smaller and features better aerodynamics. On the engine, material saving can be achieved, in particular on the hot engine components.

Preferably, the lightweight system is connected to the engine casing rearwardly remote from the rearward suspension. This enables a greater distance between propeller and pylon. Ensuing therefrom is less disturbance of the propeller flow and, consequently, reduced noise. The core engine is subjected to less load and deformation.

More particularly, the lightweight system is formed by a framework arranged circumferentially around the engine casing. A framework is a particularly stable and safe form of a lightweight system and well suitable for transmitting forces and moments.

In a preferred embodiment of the present invention, the framework has a suspension ring extending around the engine casing and being arranged in the area of the supporting structure as well as a multitude of struts extending around the engine casing and connecting the engine casing to the suspension ring, with the rearward suspension and the thrust rods being fitted to the suspension ring. This special configuration provides for optimum weight saving and transmission of forces and moments.

Preferably, the connection of the thrust rod to the suspension beam is arranged closer to the forward suspension than to the rearward suspension. This results in a small inclination of the thrust rods, enabling the thrust loads to be introduced better into the suspension beam.

In a particular development of the present invention, loads in a z-direction and in a y-direction are accommodated by the forward suspension, loads in the y-direction, the z-direction, and an x-direction, as well as torques about an x-axis are accommodated by the rearward suspension, and loads in an x-direction and bending moments about a y-axis and a z-axis are accommodated by the thrust rod. This distribution of the occurring loads to the forward suspension, the rearward suspension and the thrust rod provides for optimum transmission of the loads from the engine casing to the suspension beam and, consequently, to the supporting structure.

In particular, two thrust rods are arranged at an angle relative to each other, with both thrust rods connecting the suspension ring to the suspension beam. By using two thrust rods, the loads are dissipated at two locations of the engine casing situated remote from each other and distributed to two thrust rods.

Furthermore, the supporting structure is formed by a shear-panel carrier arranged in a pylon. The shear-panel carrier transmits the loads from the suspension beam to the aircraft fuselage. The pylon surrounding the shear-panel carrier provides for an aerodynamically favorable flow around the shear-panel carrier.

The arrangement is advantageously applicable to a propfan engine with at least one propeller arranged behind the supporting structure.

The arrangement is alternatively applicable to a propfan engine with at least one propeller arranged before the supporting structure.

The present invention is more fully described in light of the one and only FIGURE accompanying the description and showing a preferred embodiment.

FIG. 1 shows an arrangement in accordance with the present invention of a supporting structure and an engine casing.

FIG. 1 shows an arrangement 1 and a supporting structure 5 formed by a shear-panel carrier. Furthermore, FIG. 1 shows a jet engine 12 including the components core engine 2, intermediate casing 3 and gear drive 4 for propellers not shown. The jet engine 12 and its components are enclosed by an engine casing 13.

Accordingly, in the exemplary embodiment shown, the propellers are situated behind the shear-panel carrier 5 (pusher configuration). The arrangement according to the present invention is, however, also applicable to a configuration in which the propellers are situated before the shear-panel carrier 5 (puller configuration).

The core engine 2 and the gear drive 4 adjoin each other. In FIG. 1, the core engine 2 is shown to the front (V), while the gear drive 4 is shown to the rear (H). The intermediate casing 3 is situated in the front area (V) of the core engine 2.

The shear-panel carrier 5 (supporting structure) has a rectangular cross-section and is connected with a first end 5a to an aircraft fuselage. The second end 5b of the shear-panel carrier 5 is connected to the arrangement 1.

The arrangement 1 includes a suspension beam 6, a forward suspension 7, a rearward suspension 8, two thrust rods 9 and a framework 11.

The suspension beam 6 is longitudinally attached to the second end 5b of the shear-panel carrier 5 and may protrude in the forward direction (V—front) beyond the shear-panel carrier 5.

The forward suspension 7 connects the suspension beam 6 to the intermediate casing 3. The forward suspension 7 is formed by two rods 7a arranged at an angle relative to each other. The rods 7a are connected to the intermediate casing 3 via a common articulation 7b and to the suspension beam 6 via an articulation 7b each.

The rearward suspension 8 connects the suspension beam 6 to the framework 11. The rearward suspension 8 is formed by two rods 8a, which can also be articulated rods and which, symmetrically in opposite directions, connect the suspension beam 6 to the circumference of a suspension ring 10 of the framework 11. The rods 8a are each fitted at their ends to an articulation 8b on the suspension beam 6 and the suspension ring 10, respectively.

The thrust rods 9 are attached at their forward ends 9a to the suspension beam 6. Attachment of the ends 9a of the thrust rods 9 to the suspension beam 6 is at the front (V) on the shear-panel carrier 5 outside of the portion of the suspension beam 6 protruding beyond the shear-panel carrier 5.

The thrust rods 9 extend at an acute angle relative to each other and to the suspension beam 6. The thrust rods 9 have rearward ends 9b arranged symmetrically to the suspension beam 6 on a front side 10a of the suspension ring 10 of the framework 11.

The framework 11 (lightweight system) is formed by the suspension ring 10 and a plurality of struts 11a between a rear side 10b of the suspension ring 10 and the jet engine 12. The suspension ring 10 extends at the rear (H) on the shear-panel carrier 5 around the core engine 2. The struts 11a are attached to the jet engine 12 at a distance a to the shear-panel carrier 5. The struts 11a are arranged at an angle relative to each other and form a zigzag line around the jet engine 12. The use of the circumferential suspension ring 10 allows the mounting forces to be distributed evenly around the circumference of the engine to help prevent detrimental distortion of the engine.

In operation, the framework 11 transmits the forces and moments occurring at the rear (H) of the jet engine 12 to the rearward suspension 8 and the thrust rods 9. The forces occurring at the front (V) of the jet engine 12 are accommodated by the forward suspension 7.

In particular, the rearward suspension 8 takes up the forces in the direction of the x-axis, the y-axis and the z-axis according to the coordinate system K and the torque about the x-axis. The thrust rods 9 take up forces in x-direction and bending moments about the y-axis and the z-axis according to the coordinate system K. The forward suspension 7 takes up the forces in the direction of the y-axis and the z-axis according to the coordinate system K.

The forces and moments are transmitted from the forward suspension 7, the rearward suspension 8 and the thrust rods 9 to the suspension beam 6 and from there to the shear-panel carrier 5 which transmits the forces and moments to the aircraft fuselage.

LIST OF REFERENCE NUMERALS

| | |
|---|---|
| 1 | Arrangement |
| 2 | Core engine |
| 3 | Intermediate casing |
| 4 | Gear drive |
| 5 | Supporting structure (shear-panel carrier) |
| 5a | First end |
| 5b | Second end |
| 6 | Suspension beam |
| 7 | Forward suspension |
| 7a | Rod |
| 7b | Articulation |
| 8 | Rearward suspension |
| 8a | Rod |
| 8b | Articulation |
| 9 | Thrust rod |
| 9a | Forward end |
| 9b | Rearward end |
| 10 | Suspension ring |
| 10a | Front side |
| 10b | Rear side |
| 11 | Framework |
| 11a | Strut |
| 12 | Jet engine |
| 13 | Engine casing |
| a | Distance |
| K | Coordinate system |
| V | Front |
| H | Rear |

What is claimed is:

1. An arrangement for suspending a jet engine, comprising:
a suspension beam attachable to a supporting structure attached to an aircraft fuselage;
a first suspension for connecting one of a forward portion of an engine casing to a forward portion of the suspension beam and a rearward portion of the engine casing to a rearward portion of the suspension beam;
a framework for connecting to an other of the forward portion of the engine casing and the rearward portion of the engine casing;
a second suspension connecting the framework to an other of the forward portion of the suspension beam and the rearward portion of the suspension beam;
at least one thrust rod additionally connecting the framework to the suspension beam, the thrust rod arranged at an acute angle relative to the suspension beam:
wherein the framework is arranged circumferentially around the engine casing;
a plurality of struts extending around the engine casing and connecting the engine casing to the framework.

2. The arrangement of claim 1, wherein the framework connects to the engine casting outwardly of the second suspension.

3. The arrangement of claim 2, wherein the framework includes:
   a suspension ring extending circumferentially around the engine casing and being arranged near the supporting structure;
   the plurality of struts connecting the engine casing to the suspension ring;
   wherein, the second suspension and the thrust rod are connected to the suspension ring.

4. The arrangement of claim 3, wherein the connection of the thrust rod to the suspension beam is arranged closer to the first suspension than to the second suspension.

5. The arrangement of claim 4, wherein:
   loads in a y-direction and in a z-direction are accommodated by the first suspension;
   loads in an x-direction, the y-direction and the z-direction, as well as torques about an x-axis are accommodated by the second suspension; and
   loads in the x-direction and bending moments about a y-axis and a z-axis are accommodated by the thrust rod.

6. The arrangement of claim 5, and further comprising a second thrust rod, with the two thrust rods being arranged at an acute angle relative to each other, both thrust rods connecting the suspension ring to the suspension beam.

7. The arrangement of claim 6, wherein the supporting structure is formed by a shear-panel carrier arranged in a pylon.

8. The arrangement of claim 7, wherein the engine is a propfan engine having at least one propeller being arranged behind the supporting structure.

9. The arrangement of claim 7, wherein the engine is a propfan engine having at least one propeller being arranged in front of the supporting structure.

10. The arrangement of claim 1, wherein the framework includes:
    a suspension ring extending circumferentially around the engine casing and being arranged near the supporting structure;
    the plurality of struts connecting the engine casing to the suspension ring;
    wherein, the second suspension and the thrust rod are connected to the suspension ring.

11. The arrangement of claim 1, wherein the connection of the thrust rod to the suspension beam is arranged closer to the first suspension than to the second suspension.

12. The arrangement of claim 1, wherein:
    loads in a y-direction and in a z-direction are accommodated by the first suspension;
    loads in an x-direction, the y-direction and the z-direction, as well as torques about an x-axis are accommodated by the second suspension; and
    loads in the x-direction and bending moments about a y-axis and a z-axis are accommodated by the thrust rod.

13. The arrangement of claim 1, and further comprising a second thrust rod, with the two thrust rods being arranged at an acute angle relative to each other, both thrust rods connecting the framework to the suspension beam.

14. The arrangement of claim 1, wherein the supporting structure is formed by a shear-panel carrier arranged in a pylon.

15. The arrangement of claim 1, wherein the engine is a propfan engine having at least one propeller being arranged behind the supporting structure.

16. The arrangement of claim 1, wherein the engine is a propfan engine having at least one propeller being arranged in front of the supporting structure.

* * * * *